(12) United States Patent
Kitahara (10) Patent No.: US 9,049,716 B2
(45) Date of Patent: Jun. 2, 2015

(54) RADIO COMMUNICATION SYSTEM, RADIO BASE STATION, NETWORK DEVICE, AND COMMUNICATION CONTROL METHOD

(75) Inventor: Minako Kitahara, Osaka (JP)

(73) Assignee: KYOCERA Corporation, Kyoto (JP)

( * ) Notice: Subject to any disclaimer, the term of this patent is extended or adjusted under 35 U.S.C. 154(b) by 202 days.

(21) Appl. No.: 13/884,590

(22) PCT Filed: Nov. 8, 2011

(86) PCT No.: PCT/JP2011/075760
§ 371 (c)(1),
(2), (4) Date: May 9, 2013

(87) PCT Pub. No.: WO2012/063837
PCT Pub. Date: May 18, 2012

(65) Prior Publication Data
US 2013/0223401 A1    Aug. 29, 2013

(30) Foreign Application Priority Data

Nov. 10, 2010  (JP) ................................ 2010-252346
Nov. 10, 2010  (JP) ................................ 2010-252348

(51) Int. Cl.
*H04Q 9/00* (2006.01)
*H04W 72/04* (2009.01)
*H04W 72/08* (2009.01)

(52) U.S. Cl.
CPC ........ *H04W 72/0426* (2013.01); *H04W 72/082* (2013.01)

(58) Field of Classification Search
CPC .................... H04W 72/0406; H04W 72/082
USPC ........................................ 370/329; 455/63.3
See application file for complete search history.

(56) References Cited

U.S. PATENT DOCUMENTS

| 2010/0182972 A1 | 7/2010 | Katayama et al. |
| 2010/0233963 A1* | 9/2010 | Harada et al. ................. 455/63.3 |
| 2010/0238895 A1* | 9/2010 | Nakatsugawa et al. ........ 370/329 |

FOREIGN PATENT DOCUMENTS

| JP | 2006-217415 A | 8/2006 |
| JP | 2010-171558 A | 8/2010 |
| WO | 2009/116407 A1 | 9/2009 |

OTHER PUBLICATIONS

3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overal description; Stage 2 (Release 9).

*Primary Examiner* — Wanda Z Russell
(74) *Attorney, Agent, or Firm* — Studebaker & Brackett PC (57) ABSTRACT

An eNB10-1 receives high-interference RB information from eNB10-2 to eNB10-4, and acquires a transmission power value for UE40-10. When the transmission power value for UE40-1 is greater than or equal to a transmission power threshold value, eNB10-1 restricts the assignment of high-interference RBs to UE40-1, and when the transmission power value for UE40-1 is less than the transmission power threshold value, eNB10-1 assigns high-interference RBs to UE40-1 in a preferential manner.

9 Claims, 9 Drawing Sheets

|  | HIGH INTERFERENCE FLAG | | | WHETHER POSSIBLE TO ASSIGN TO HIGH TRANSMISSION POWER UE40-1 |
|---|---|---|---|---|
|  | eNB10-2 | eNB10-3 | eNB10-4 |  |
| RB50 | 1 |  |  | NOT POSSIBLE |
| RB49 | 1 |  |  | NOT POSSIBLE |
| RB48 |  | 1 |  | NOT POSSIBLE |
| RB47 |  |  | 1 | NOT POSSIBLE |
| RB46 |  |  |  | POSSIBLE |
| ⋮ | ⋮ | ⋮ | ⋮ | ⋮ |
| RB5 |  |  |  | POSSIBLE |
| RB4 | 1 |  |  | NOT POSSIBLE |
| RB3 |  |  | 1 | NOT POSSIBLE |
| RB2 |  |  |  | POSSIBLE |
| RB1 | 1 |  |  | NOT POSSIBLE |

RADIO COMMUNICATION SYSTEM, RADIO BASE STATION, NETWORK DEVICE, AND COMMUNICATION CONTROL METHOD

TECHNICAL FIELD

The present invention relates to a radio communication system configured by a plurality of radio base stations, a radio base station, and a communication control method in the radio base station. Furthermore, the present invention relates to a network device configured in a radio communication system including a plurality of radio base stations, and a communication control method in the network device.

BACKGROUND ART

In 3GPP (Third Generation Partnership Project), according to a radio communication system corresponding to LTE (Long Term Evolution) having a standard being designed, an LTE base station eNB assigns a resource block (RB), that is, a frequency resource, to a radio terminal UE. Furthermore, the radio communication system corresponding to the LTE has a function of Inter-Cell Interference Coordination (ICIC) in order to reduce inter-eNB interference (for example, refer to Non Patent Literature 1). In the ICIC, eNB periodically exchanges an LI (Load Information) message with another eNB. The LI message is information concerning an interference (interference information), and includes an OI (Overload Indicator), an HII (High Interference Indicator), and an RNTPI (Relative Narrowband Tx Power Indicator).

CITATION LIST

Non Patent Literature

[Non Patent Literature 1] 3GPP TS 36.300 V9.4.0 (2010-06)

SUMMARY OF THE INVENTION

When the eNB assigns a resource block to UE, it is necessary to reduce interference. However, in the current state, there is no appropriate reference for resource block assignment for interference reduction. Furthermore, the eNB does not always effectively utilize the LI message from other eNB in order to reduce interference in the resource block assignment.

In view of the above-described problems, and an object of the present invention is to provide a radio communication system capable of assigning a frequency resource to appropriately reduce interference between radio base stations, a radio base station, a network device, and a communication control method.

Means to Solve the Problem

To solve the above problem, the present invention has following features.

A feature of the present invention is summarized as a radio communication system (radio communication system 1) comprising a plurality of radio base stations (eNB 10-1 to eNB 10-4) and capable of assigning a frequency resource to a radio terminal (UE 40-1, UE 40-2, UE 40-3, UE 40-4) connected to the radio base stations, wherein a first radio base station (eNB 10-1) comprises: a transmission unit (radio communication unit 106, eNB interference information transmission processing unit 162) that transmits information on a high interference frequency resource that is a frequency resource in which power in the first radio base station exceeds a predetermined threshold value, and a second radio base station (eNB 10-2) comprises: a reception unit (radio communication unit 106, other eNB interference information reception processing unit 158) that receives the information on the high interference frequency resource from the first radio base station; an acquisition unit (UE transmission power value acquisition unit 156) that acquires a transmission power value of a radio terminal; and a control unit (RB assignment control unit 160) that controls assignment of a frequency resource to the radio terminal on the basis of the information on the high interference frequency resource received by the reception unit, and the transmission power value of the radio terminal acquired by the acquisition unit.

According to the radio communication system, the first radio base station transmits the information on the high interference frequency resource, and the second radio base station controls the assignment of the frequency resource to the radio terminal on the basis of the received information on the high interference frequency resource and the transmission power value of the radio terminal. Consequently, the second radio base station is able to assign the frequency resource to the radio terminal in consideration of interference to the first radio base station and the transmission power value of the radio terminal, thereby achieving the assignment of the frequency resource in which interference between radio base stations is reduced.

A feature of the present invention is summarized as a radio base station comprising a radio communication system with an another radio base station, comprising: a first reception unit (radio communication unit 106, other eNB interference information reception processing unit 158) that receives information on a high interference frequency resource from the another radio base station, wherein the high interference frequency resource, interference power of which exceeds an interference power threshold value; an acquisition unit (UE transmission power value acquisition unit 156) that acquires a transmission power value of a radio terminal; and a control unit (RB assignment control unit 160) that controls assignment of a frequency resource to the radio terminal on the basis of the information on the high interference frequency resource received by the first reception unit, and the transmission power value of the radio terminal acquired by the acquisition unit.

The feature of the present invention is summarized as that the control unit limits assignment of the high interference frequency resource to a radio terminal having the transmission power value equal to or more than a transmission power threshold value, and preferentially assigns the high interference frequency resource to a radio terminal having the transmission power value smaller than the transmission power threshold value.

The feature of the present invention is summarized as that preambles of a random access channel (PRACH) are divided into a first group and a second group in such a manner that preambles belonging to the first group are used by a radio terminal when the transmission power value is equal to or more than the transmission power threshold value, and preambles belonging to the second group are used by a radio terminal when the transmission power value is smaller than the transmission power threshold value, and the acquisition unit determines that the transmission power value is equal to or more than the transmission power threshold value when a preamble received from the radio terminal belongs to the first group, and determines that the transmission power value is smaller than the transmission power threshold value when the preamble received from the radio terminal belongs to the second group.

The feature of the present invention is summarized as that the control unit controls the assignment of the frequency resource to the radio terminal, in accordance with a change in the information on the high interference frequency resource and a change in the transmission power value of the radio terminal acquired by the acquisition unit during communication with the radio terminal.

The feature of the present invention is summarized as that the radio base station comprising: a first transmission unit (radio communication unit 106, interference power threshold value change request information transmission processing unit 166) that transmits information for requesting a change in the interference power threshold value to the another radio base station.

The feature of the present invention is summarized as that the radio base station comprising: a second transmission unit (radio communication unit 106, eNB interference information transmission processing unit 162) that transmits information on a high interference frequency resource to the another radio base station, the high interference frequency resource being a frequency resource in which interference power in the radio base station is equal to or more than the interference power threshold value.

The feature of the present invention is summarized as that the radio base station comprising: a second reception unit (radio communication unit 106, interference power threshold value change request information transmission processing unit 266) that receives information for requesting a change in the interference power threshold value from the another radio base station; and a first adjustment unit (eNB interference power threshold value adjustment unit 264) that adjusts the interference power threshold value in accordance with the information for requesting the change in the interference power threshold value, the information being received by the second reception unit.

The feature of the present invention is summarized as that the radio base station comprising: a second adjustment unit that increases the interference power threshold value when a new radio base station joins the radio communication system.

A feature of the present invention is summarized as a communication control method in a radio base station forming a radio communication system together with an another radio base station, the method comprising: a step of receiving information on a high interference frequency resource from the another radio base station, wherein the high interference frequency resource, interference power of which is equal to or more than a predetermined threshold value; a step of acquiring a transmission power value of a radio terminal; and a step of controlling assignment of a frequency resource to the radio terminal on the basis of the received information on the high interference frequency resource, and the acquired transmission power value of the radio terminal.

A feature of the present invention is summarized as a network device (eNB 10-1 to eNB 10-4, upper node 20) provided in a radio communication system including a first radio base station and a second radio base station, comprising: an adjustment unit (other eNB interference power threshold value adjustment unit 164, eNB interference power threshold value adjustment unit 264) that adjusts a predetermined threshold value (interference power threshold value) that is compared with power in an uplink frequency resource assigned to a radio terminal, in accordance with a positional relation between the first radio base station and the second radio base station, when the first radio base station determines whether the frequency resource is a high interference frequency resource.

The first radio base station determines whether the frequency resource is a high interference frequency resource. In this case, the network device adjusts the threshold value that is compared with power in an uplink frequency resource assigned to a radio terminal, in accordance with the positional relation between the first radio base station and the second radio base station. Consequently, the threshold value is adjusted, when the first radio base station is located far away from the second radio base station, in other word, when it is low possibility that the interference at the first radio base station is caused by the communication between the second radio base station and the radio terminal. Therefore, it is possible to lower the possibility that the first radio base station determines it as the high interference, and to prevent a transmission of the information on the high interference frequency resource despite that it is not caused by the communication between the second radio base station and the radio terminal. That is, it is possible to prevent that the second radio base station assigns the frequency resource by excessive consideration of the interference at the first radio base station, and to assign the frequency resource where the interference between the radio base stations is appropriately reduced.

The feature of the present invention is summarized as that the adjustment unit increases the predetermined threshold value as a distance between the first radio base station and the second radio base station becomes long.

A feature of the present invention is summarized as that a network device (eNB 10-1 to eNB 10-4, upper node 20) provided in a radio communication system including a first radio base station and a second radio base station, comprising:

an adjustment unit (other eNB interference power threshold value adjustment unit 164, eNB interference power threshold value adjustment unit 264) that adjusts a predetermined threshold value (interference power threshold value) that is compared with power in an uplink frequency resource assigned to a radio terminal, in accordance with an index indicating transmission power of the second radio base station, when the first radio base station determines whether the frequency resource is a high interference frequency resource.

The first radio base station determines whether the frequency resource is a high interference frequency resource. In this case, the network device adjusts the threshold value that is compared with power in an uplink frequency resource assigned to a radio terminal, in accordance with the index indicating the transmission power of the second radio base station. Consequently, the threshold value is adjusted, when the first radio base station is located far away from the second radio base station, in other word, when it is low possibility that the interference at the first radio base station is caused by the communication between the second radio base station and the radio terminal. Therefore, it is possible to lower the possibility that the first radio base station determines it as the high interference, and to prevent a transmission of the information on the high interference frequency resource despite that it is not caused by the communication between the second radio base station and the radio terminal. That is, it is possible to prevent that the second radio base station assigns the frequency resource by excessive consideration of the interference at the first radio base station, and to assign the frequency resource where the interference between the radio base stations is appropriately decreased.

The feature of the present invention is summarized as that the adjustment unit increases the predetermined threshold value as the transmission power of the second radio base station indicated by the index is low.

The feature of the present invention is summarized as that the adjustment unit adjusts the predetermined threshold value for each first radio base station, when a plurality of first radio base stations exist.

The feature of the present invention is summarized as that the adjustment unit reduces the predetermined threshold value, when the first radio base station is newly added.

The feature of the present invention is summarized as that the adjustment unit adjusts the predetermined threshold value in accordance with a distance between the second radio base station and the first radio base station remotest from the second radio base station, when a plurality of first radio base stations exist.

The feature of the present invention is summarized as that the first radio base stations are divided into a plurality of groups in accordance with a distance to the second radio base station, when a plurality of first radio base stations exist, and the adjustment unit adjusts the predetermined threshold value for each group.

A feature of the present invention is summarized as that a communication control method in a network device provided in a radio communication system including a first radio base station and a second radio base station, comprising: a step of adjusting a predetermined threshold value that is compared with power in an uplink frequency resource assigned to a radio terminal, in accordance with a positional relation between the first radio base station and the second radio base station, when the first radio base station determines whether the frequency resource is a high interference frequency resource.

A feature of the present invention is summarized as that a communication control method in a network device provided in a radio communication system including a first radio base station and a second radio base station, comprising: a step of adjusting a predetermined threshold value that is compared with power in an uplink frequency resource assigned to a radio terminal, in accordance with an index indicating transmission power of the second radio base station, when the first radio base station determines whether the frequency resource is a high interference frequency resource.

DESCRIPTION OF EMBODIMENTS

Next, an embodiment of the present invention will be described with reference to the drawings. Specifically, a schematic configuration of a radio communication system, a configuration of eNB, a configuration of UE, an operation of the radio communication system, an operation and an effect, and other embodiments will be described. It is to be noted that the same or similar reference numerals are applied to the same or similar parts through the drawings in the following embodiments.

(1) Schematic Configuration of Radio Communication System

Figure 1:
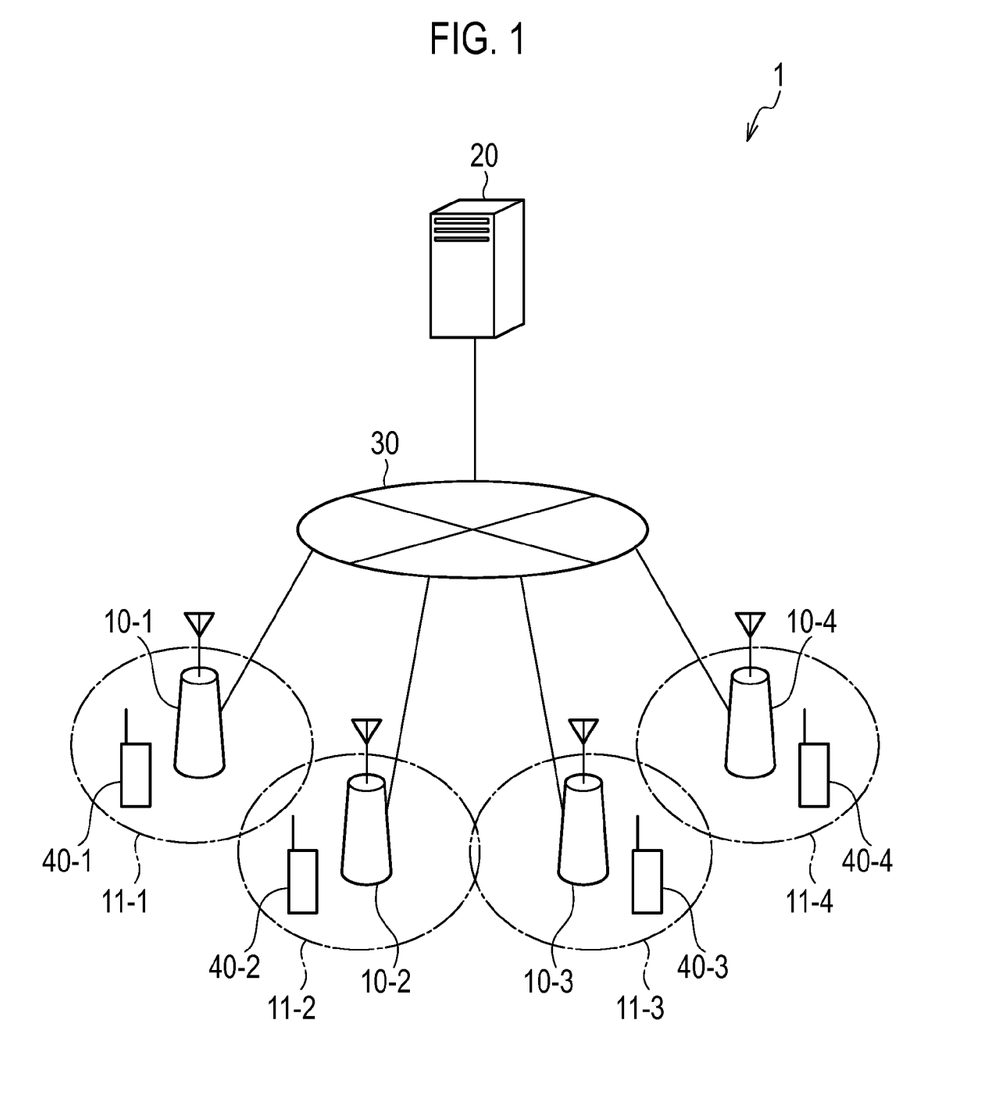
FIG. 1 is a diagram illustrating the entire schematic configuration of a radio communication system according to an embodiment of the present invention.

FIG. 1 is a diagram illustrating the schematic configuration of a radio communication system according to the present embodiment. In the present embodiment, a radio communication system 1 is configured by using an LTE technology. The radio communication system 1 illustrated in FIG. 1 includes LTE base stations (eNB) 10-1, eNB 10-2, eNB 10-3, and eNB 10-4, an upper node 20 configured to have functions of MME (Mobile Management Entity), SGW (Serving Gateway), OAM (Operation Administration and Maintenance) and the like, a backhaul 30 configured to connect the eNB 10-1 to the eNB 10-5 to the upper node 20, and radio terminals (UE) 40-1, UE 40-2, UE 40-3, and UE 40-4.

The eNB 10-1 forms a cell 11-1. The UE 40-1 exists in the cell 11-1. The eNB 10-2 forms a cell 11-2. The UE 40-2 exists in the cell 11-2. The eNB 10-3 forms a cell 11-3. The UE 40-3 exists in the cell 11-3. The eNB 10-4 forms a cell 11-4. The UE 40-4 exists in the cell 11-4.

The eNB 10-1 assigns a resource block (RB), that is, a frequency resource, to the UE 40-1 and performs radio communication with the UE 40-1. The eNB 10-2 assigns the RB to the UE 40-2 and performs radio communication with the UE 40-2. The eNB 10-3 assigns the RB to the UE 40-3 and performs radio communication with the UE 40-3. The eNB 10-4 assigns the RB to the UE 40-4 and performs radio communication with the UE 40-4. In the LTE, a communication scheme between the eNB and the UE is called E-UTRAN (Evolved UMTS Terrestrial Radio Access Network).

Figure 2:
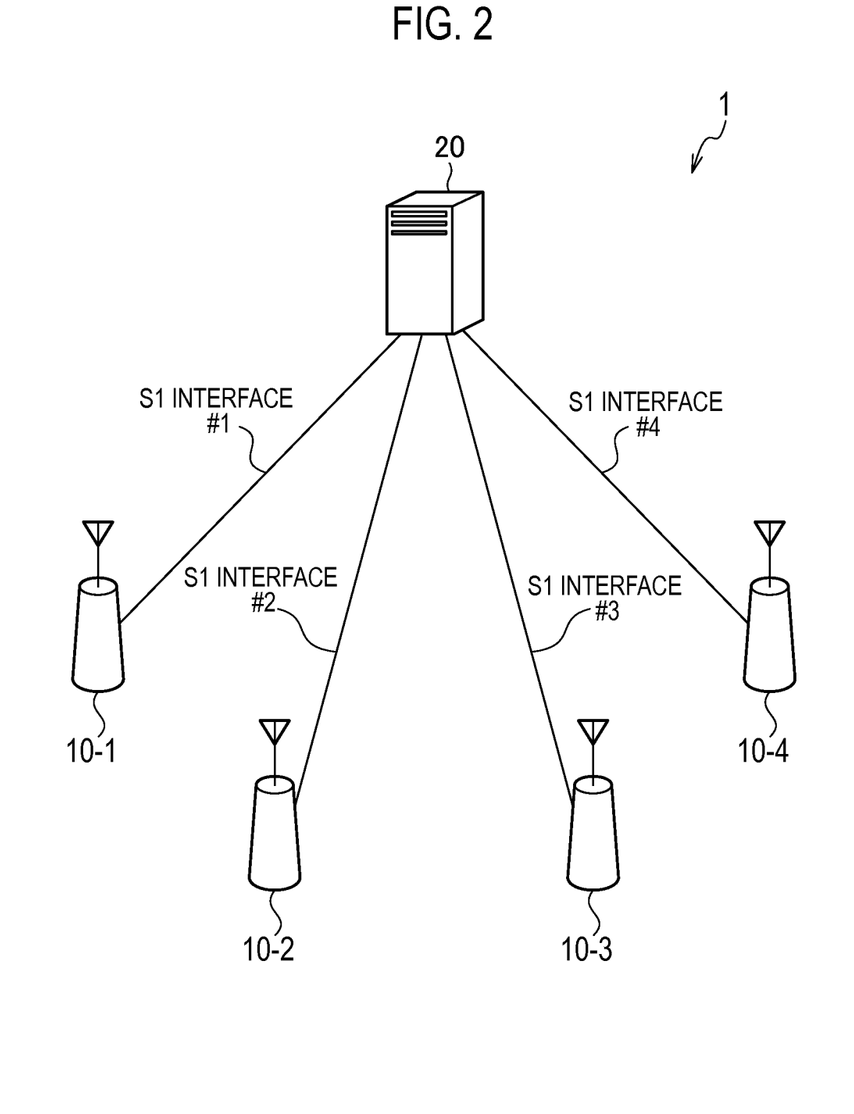
FIG. 2 is a diagram illustrating a state where an S1 interface is established in the radio communication system according to the embodiment of the present invention.

FIG. 2 is a diagram illustrating a state where an S1 interface is established in the radio communication system 1. In FIG. 2, between the eNB 10-1 and the upper node 20, an S1 interface #1, which is a logical transmission channel of a transport layer, is established through the backhaul 30. Between the eNB 10-2 and the upper node 20, an S1 interface #2 is established through the backhaul 30. Between the eNB 10-3 and the upper node 20, an S1 interface #3 is established through the backhaul 30. Between the eNB 10-4 and the upper node 20, an S1 interface #4 is established through the backhaul 30.

Figure 3:
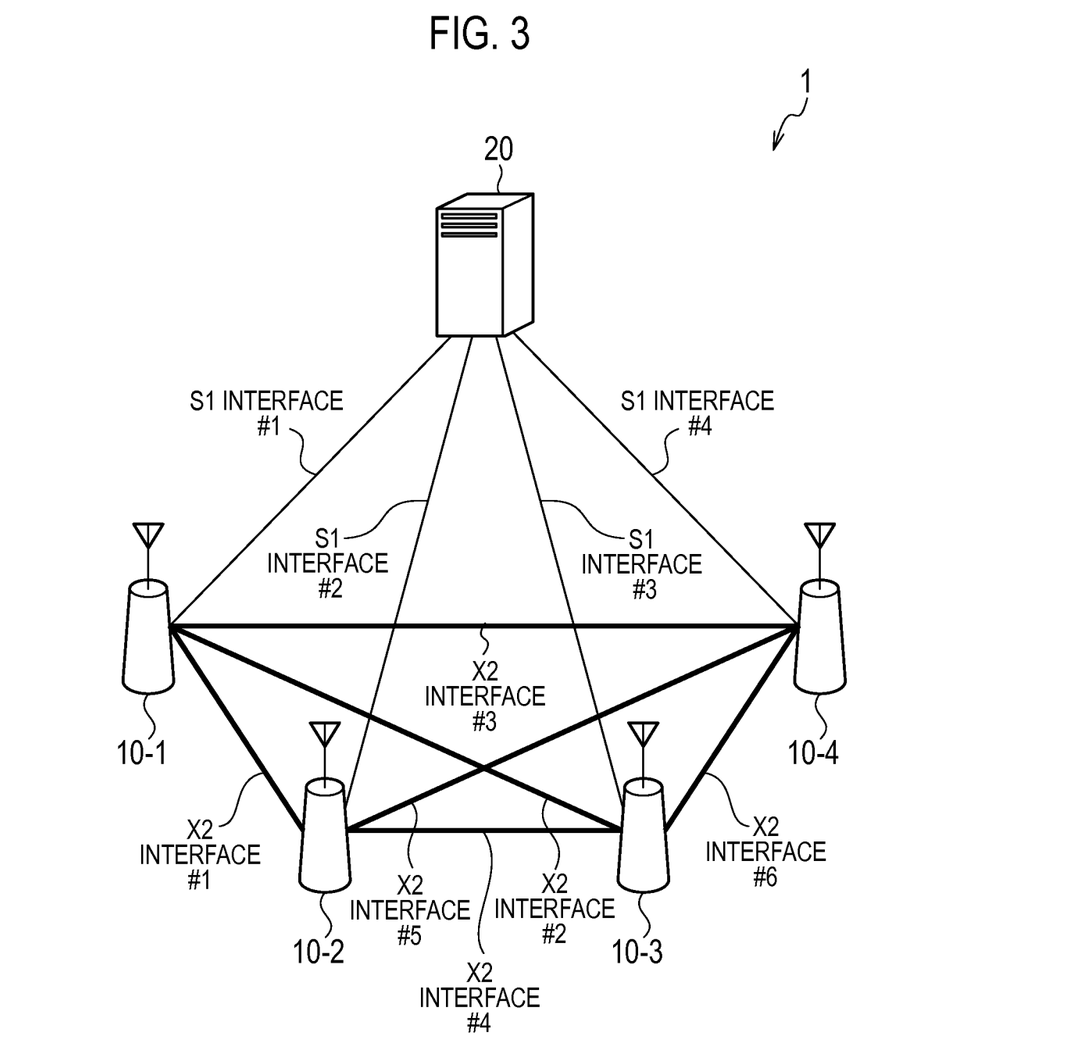
FIG. 3 is a diagram illustrating a state where an X2 interface is established in the radio communication system according to the embodiment of the present invention.

FIG. 3 is a diagram illustrating a state where an X2 interface is established in the radio communication system 1. In FIG. 3, between the eNB 10-1 and the eNB 10-2, an X2 interface #1, which is a logical transmission channel of a transport layer, is established through the backhaul 30. Between the eNB 10-1 and the eNB 10-3, an X2 interface #2 is established through the backhaul 30. Between the eNB 10-1 and the eNB 10-4, an X2 interface #3 is established through the backhaul 30. Between the eNB 10-2 and the eNB 10-3, an X2 interface #4 is established through the backhaul 30. Between the eNB 10-2 and the eNB 10-4, an X2 interface #5 is established through the backhaul 30. Between the eNB 10-3 and the eNB 10-4, an X2 interface #6 is established through the backhaul 30.

(2) Configuration of eNB and Configuration of UE

Figure 4:
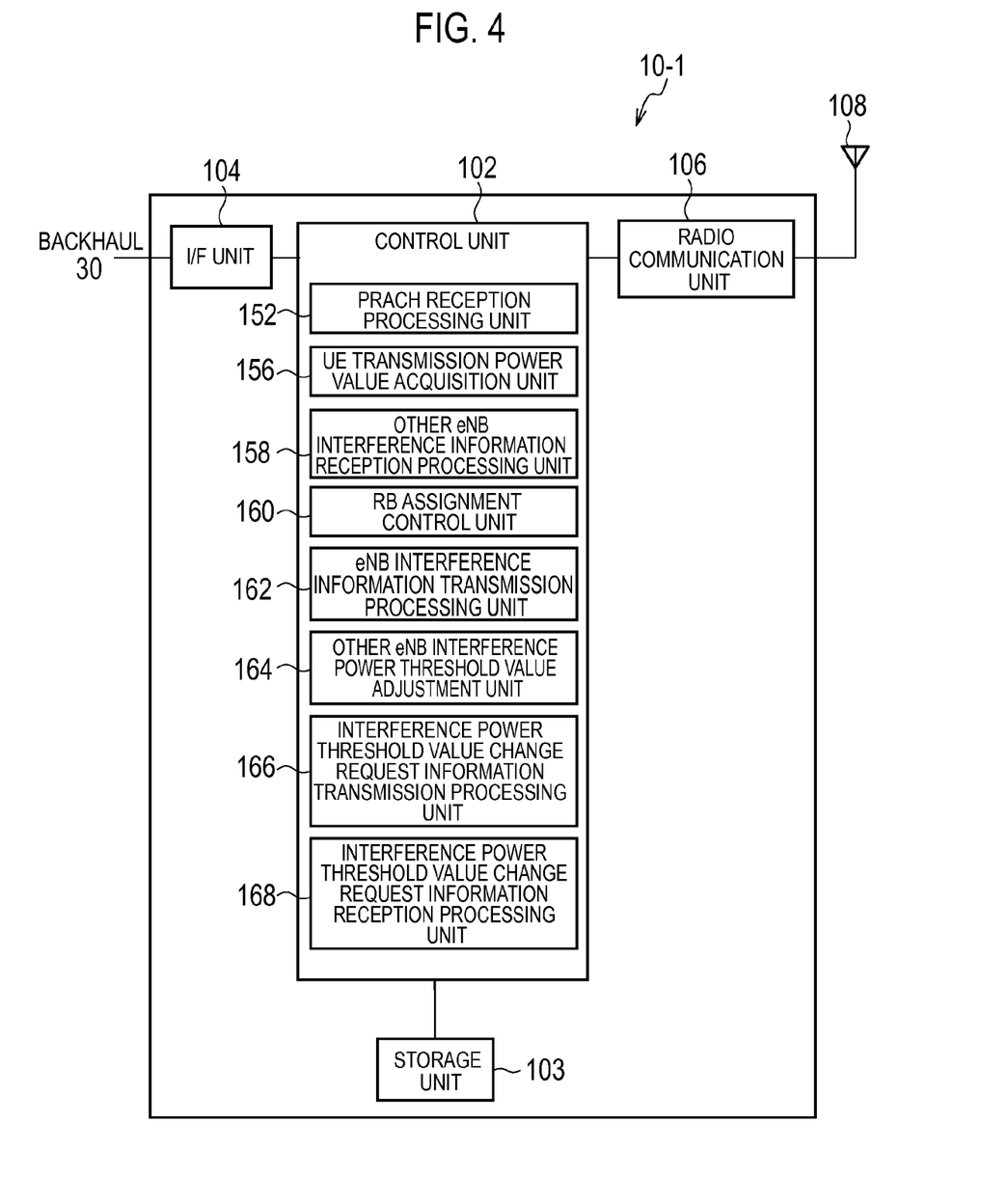
FIG. 4 is a configuration diagram of eNB according to the embodiment of the present invention.

FIG. 4 is a diagram illustrating the configuration of the eNB 10-1. The eNB 10-1 illustrated in FIG. 4 includes a control unit 102, a storage unit 103, an I/F unit 104, a radio communication unit 106, and an antenna 108. In addition, the eNB 10-2 to the eNB 10-4 also have the same configuration as that of the eNB 10-1.

The control unit 102, for example, is configured using a CPU (Central Processing Unit) or a DSP (Digital Signal Processor), and controls various functions provided in the eNB 10-1. The storage unit 103, for example, is configured by a memory, and stores various types of information used for the control and the like of the eNB 10-1.

The I/F unit 104 is connected to the backhaul 30. The radio communication unit 106 includes an RF circuit, a baseband circuit and the like, performs modulation, demodulation, encoding, decoding and the like, and performs the transmission and reception of a radio signal with respect to the UE 40-1 through the antenna 108.

The control unit 102 includes a PRACH (Physical Random Access Channel) reception processing unit 152, a UE transmission power value acquisition unit 156, an other eNB interference information reception processing unit 158, an RB assignment control unit 160, an eNB interference information transmission processing unit 162, an other eNB interference power threshold value adjustment unit 164, an interference power threshold value change request information transmission processing unit 166, and an interference power threshold value change request information reception processing unit 168.

Figure 5:
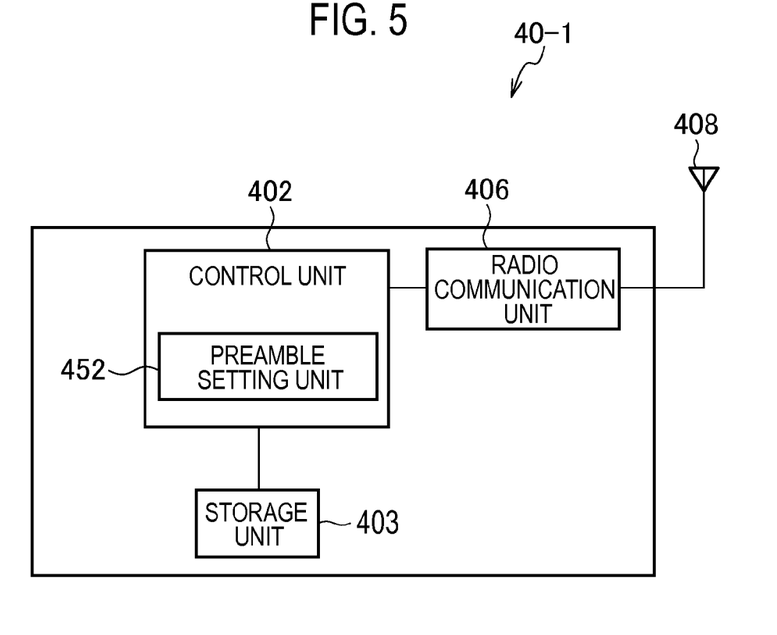
FIG. 5 is a configuration diagram of UE according to the embodiment of the present invention.

FIG. 5 is a diagram illustrating the configuration of the UE 40-1. The UE 40-1 illustrated in FIG. 5 includes a control unit 402, a storage unit 403, a radio communication unit 406, and an antenna 408. In addition, the UE 40-2 to the UE 40-4 also have the same configuration as that of the UE 40-1.

The control unit 402, for example, is configured using a CPU (Central Processing Unit) or a DSP (Digital Signal Processor), and controls various functions provided in the UE 40-1. The storage unit 403, for example, is configured by a memory, and stores various types of information used for the control and the like of the UE 40-1.

The radio communication unit 406 includes an RF circuit, a baseband circuit and the like, performs modulation, demodulation, encoding, decoding and the like, and performs the transmission and reception of a radio signal with respect to the eNB 10-1 through the antenna 408. The control unit 402 includes a preamble setting unit 452.

Hereinafter, a description will be provided for: a process (a first process) in which the eNB 10-1 controls the assignment of RB to the UE 40-1; a process (a second process) by the eNB 10-1, when either one of: the eNB 10-2 controls of the assignment of RB to the UE 40-2, the eNB 10-3 controls of the assignment of RB to UE 40-3, or the eNB 10-4 controls of the assignment of RB to the UE 40-4; is performed, and a process (a third process) of interference power threshold value adjustment by the eNB 10-1.

(First Process)

When initially connected to the eNB 10-1, the PRACH group setting unit 452 in the control unit 402 of the UE 40-1 sets a preamble used for transmission, from among preambles in PRACH.

The preambles in the PRACH are divided into two groups in advance, and a first group is a set of preambles transmitted by the UE 40-1 when a transmission power value of the UE 40-1 is equal to or more than a threshold value (a transmission power threshold value) determined in advance. A second group is a set of preambles transmitted by the UE 40-1 when the transmission power value of the UE 40-1 is smaller than the transmission power threshold value.

When the transmission power value of the UE 40-1 is equal to or more than the transmission power threshold value, the preamble setting unit 452 sets preambles belonging to the first group. Furthermore, when the transmission power value of the UE 40-1 is smaller than the transmission power threshold value, the preamble setting unit 452 sets preambles belonging to the second group. The control unit 402 transmits a radio signal of PRACH corresponding to the set preamble through the radio communication unit 406 and the antenna 408.

Figure 6:
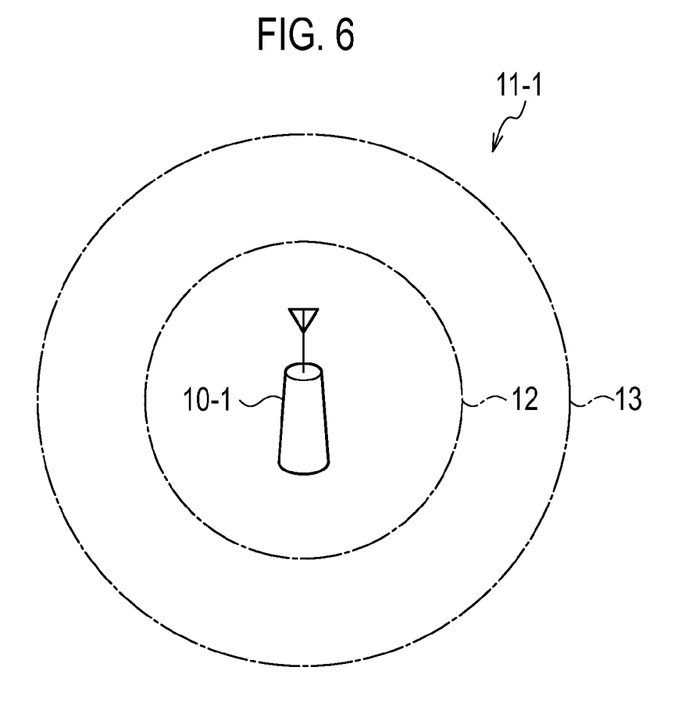
FIG. 6 is a diagram for explaining a correspondence relation between an inner region and an outer region of a cell formed by the eNB and a preamble according to the embodiment of the present invention.

Furthermore, it is assumed that the transmission power value of the UE 40-1 is increased as a distance to the eNB 10-1 becomes long. FIG. 6 is a diagram for explaining a correspondence relation between an inner region 12 and an outer region 13 of the cell 11-1 formed by the eNB 10-1, and a preamble. When the UE 40-1 exists in the inner region 12 that is a circular region, the transmission power value of the UE 40-1 is smaller than the transmission power threshold value. Accordingly, the UE 40-1 sets and transmits a preamble belonging to the second group. Meanwhile, when the UE 40-1 exists in the inner region 13 that is an annular region, the transmission power value of the UE 40-1 is equal to or more than the transmission power threshold value. Accordingly, the UE 40-1 sets a preamble belonging to the first group and transmits a radio signal of PRACH corresponding to the preamble.

In an initial state, the control unit 402 transmits a radio signal with a transmission power value smaller than the transmission power threshold value. Therefore, in the initial state, the preamble setting unit 452 sets the preamble belonging to the second group. In this case, since the transmission power value is low, when the eNB 10-1 is not able to receive a radio signal of PRACH corresponding to the preamble, the eNB 10-1 does not transmit a response radio signal to the UE 40-1. The control unit 402 gradually increases the transmission power value until it is possible to receive the response radio signal, and the preamble setting unit 452 sets a preamble belonging to a group according to the transmission power value.

The PRACH reception processing unit 152 in the control unit 102 of the eNB 10-1 receives the radio signal of PRACH corresponding to the preamble from the UE 40-1 through the antenna 108 and the radio communication unit 106.

The UE transmission power value acquisition unit 156 determines whether a preamble corresponding to the received radio signal of PRACH belongs to the first group or the second group. When the preamble belongs to the first group, the UE transmission power value acquisition unit 156 determines that the transmission power value of the UE 40-1 (a transmission source) is equal to or more than the transmission power threshold value. Furthermore, when the preamble belongs to the second group, the UE transmission power value acquisition unit 156 determines that the transmission power value of the UE 40-1 (the transmission source) is smaller than the transmission power threshold value.

The other eNB interference information reception processing unit 158 receives high interference resource block information (high interference RB information), which is transmitted from the eNB 10-2, the eNB 10-3, and the eNB 10-4, through the X2 interface established in the backhaul 30 and the I/F unit 104. Furthermore, the high interference RB indicates RB, in which power is equal to or more than a threshold value (interference power threshold value) determined in advance, among uplink RBs assigned to UE by eNB. The high interference RB information is configured by information for identifying RB determined as the high interference RB.

The other eNB interference information reception processing unit 158 receives high interference resource block information (high interference RB information), which is transmitted from the eNB 10-2, the eNB 10-3, and the eNB 10-4, through the X2 interface established in the backhaul 30 and the I/F unit 104. Furthermore, the high interference RB indicates RB, in which interference power is equal to or more than the threshold value (interference power threshold value) determined in advance, among the uplink RBs assigned to the UE by the eNB. The high interference RB information includes information capable of identifying the RB determined as the high interference RB in eNB (a transmission source).

On the basis of the received high interference RB information, the RB assignment control unit 160 sets, in RBs (RB1 to RB50), a high interference flag indicating whether the RBs are determined as the high interference RB in the eNB 10-2 to the eNB 10-4. When the transmission power value of the UE 40-1 is equal to or more than the transmission power threshold value, the RB assignment control unit 160 assigns RBs, in which no high interference flag is set, to the UE 40-1 without assigning RBs in which the high interference flag is set. However, when unassigned RB does not exist in the RBs in which no high interference flag is set, the RB assignment control unit 160 may assign the RBs in which the high interference flag is set.

Meanwhile, when the transmission power value of the UE 40-1 is smaller than the transmission power threshold value, the RB assignment control unit 160 preferentially assigns the RBs, in which the high interference flag is set, to the UE 40-1 more than the RBs in which no high interference flag is set. However, when the unassigned RB does not exist in the RBs in which the high interference flag is set, the RB assignment control unit 160 may assign the RBs in which no high interference flag is set.

Figure 7:
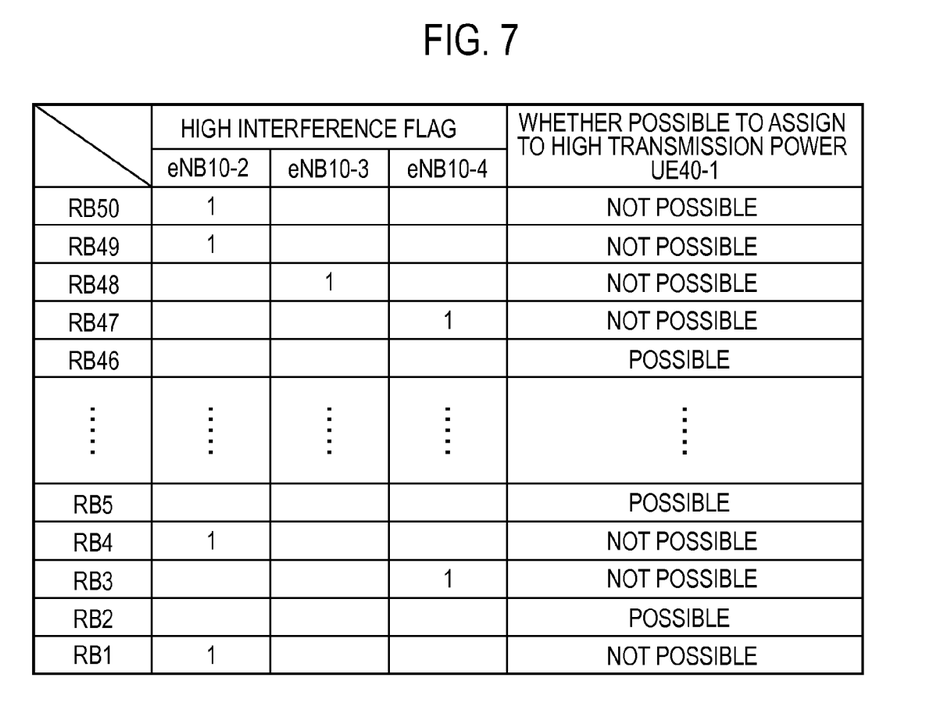
FIG. 7 is a diagram illustrating an example of RB assignment control according to the embodiment of the present invention.

FIG. 7 is a diagram illustrating an example of RB assignment control. In FIG. 7, the high interference flag is not set in RB2, RB5, and RB46. Accordingly, the RB assignment control unit 160 determines that the RB2, the RB5, and the RB46 are assignable to the UE (high transmission power UE) 40-1 having a transmission power value equal to or more than the transmission power threshold value.

The RB assignment control unit 160 transmits assignment RB information including information capable of identifying assigned RB to the UE 40-1 through the radio communication unit 106 and the antenna 108.

Then, the eNB 10-1 and the UE 40-1 start radio communication using RB assigned to the UE 40-1.

Even after the radio communication is started, the other eNB interference information reception processing unit 158 receives the high interference resource block information, which is transmitted from the eNB 10-2, the eNB 10-3, and the eNB 10-4, through the antenna 108 and the radio communication unit 106.

The UE transmission power value acquisition unit 156 determines whether the received preamble belongs to the first group or the second group. The UE transmission power value acquisition unit 156 determines that the transmission power value of the UE 40-1 (the transmission source) is equal to or more than the transmission power threshold value when the received preamble belongs to the first group, and determines that the transmission power value of the UE 40-1 (the transmission source) is smaller than the transmission power threshold value when the received preamble belongs to the second group.

On the basis of the received high interference RB information, the RB assignment control unit 160 sets, in RBs (RB1 to RB50), a high interference flag indicating whether the RBs are determined as the high interference RB in the eNB 10-2 to the eNB 10-4. When the transmission power value of the UE 40-1 is equal to or more than the transmission power threshold value, the RB assignment control unit 160 assigns RBs, in which no high interference flag is set, to the UE 40-1 without assigning RBs in which the high interference flag is set. Meanwhile, when the transmission power value of the UE 40-1 is smaller than the transmission power threshold value, the RB assignment control unit 160 preferentially assigns the RBs, in which the high interference flag is set, to the UE 40-1 more than the RBs in which no high interference flag is set.

When RB to be assigned is changed, the RB assignment control unit 160 transmits assignment RB information including information capable of identifying assigned RB to the UE 40-1 through the radio communication unit 106 and the antenna 108.

(Second Process)

The eNB interference information transmission processing unit 162 receives a signal from the UE 40-1, which has been connected to the eNB 10-1, through the antenna 108 and the radio communication unit 106. Moreover, on the basis of the received signal, the eNB interference information transmission processing unit 162 attempts to detect RB (high interference RB), in which power is equal to or more than the interference power threshold value, from RBs assigned to the UE 40-1. When the high interference RB is detected, the eNB interference information transmission processing unit 162 generates high interference RB information including information capable of identifying the high interference RB. The eNB interference information transmission processing unit 162 transmits the generated high interference RB information to the eNB 10-2, the eNB 10-3, and the eNB 10-4 through the I/F unit 104 and the X2 interface established in the backhaul 30 (through the S1 interface when there is no X2 interface). When the high interference RB information is received, the control units 102 in the eNB 10-2, the eNB 10-3, and the eNB 10-4 perform the same process as the aforementioned first process and control the assignment of RB to UE.

(Third Process)

The other eNB interference power threshold value adjustment unit 164 receives downlink radio signals, which are transmitted from the eNB 10-2, the eNB 10-3, and the eNB 10-4, through the antenna 108 and the radio communication unit 106.

The other eNB interference power threshold value adjustment unit 164 calculates distances from the eNB 10-1 to the eNB 10-2, the eNB 10-3, and the eNB 10-4 that are transmission sources of the received downlink radio signals.

Furthermore, a range (neighboring eNB range), in which eNB (other eNB), other than the eNB 10-1, is regarded as eNB (neighboring eNB) adjacent to the eNB 10-1, has been set in advance. Next, the other eNB interference power threshold value adjustment unit 164 calculates propagation loss (path loss) between the eNB 10-1 and the eNB 10-2, the eNB 10-3, and the eNB 10-4 that are transmission sources of the received downlink radio signals. The propagation loss includes distance attenuation, shadowing loss, and feature pass loss.

The other eNB interference power threshold value adjustment unit 164 receives reference signals (SRS), which are downlink radio signals from the eNB 10-2, the eNB 10-3, and the eNB 10-4, and a signal including transmission power of the reference signals. Next, the other eNB interference power threshold value adjustment unit 164 measures power (received power) of the reference signals. The other eNB interference power threshold value adjustment unit 164 detects a difference between the transmission power and received power of the reference signals as propagation loss. Moreover, on the basis of the propagation loss, the other eNB interference power threshold value adjustment unit 164 calculates the distances from the eNB 10-1 to the eNB 10-2, the eNB 10-3, and the eNB 10-4. Furthermore, it is assumed that the calculated distances are proportional to corresponding propagation loss.

Next, the other eNB interference power threshold value adjustment unit 164 compares the distances from the eNB 10-1 to the eNB 10-2, the eNB 10-3, and the eNB 10-4 with a distance indicating the neighboring eNB range. Moreover, when the distance between the eNB 10-1 and the eNB 10-2 is equal to or less than the distance indicating the neighboring eNB range, the other eNB interference power threshold value adjustment unit 164 determines the eNB 10-2 as neighboring eNB. Similarly, when the distance between the eNB 10-1 and the eNB 10-3 is equal to or less than the distance indicating the neighboring eNB range, the other eNB interference power threshold value adjustment unit 164 determines the eNB 10-3 as neighboring eNB, and when the distance between the eNB 10-1 and the eNB 10-4 is equal to or less than the distance indicating the neighboring eNB range, the other eNB interference power threshold value adjustment unit 164 determines the eNB 10-4 as neighboring eNB. In addition, the neighboring eNB may be determined in accordance with the propagation loss, instead of the distance.

Next, the other eNB interference power threshold value adjustment unit 164 reads an interference power threshold value stored in the storage unit 103 in advance. Then, the other eNB interference power threshold value adjustment unit 164 adjusts the interference power threshold value for each neighboring eNB. Specifically, the other eNB interference power threshold value adjustment unit 164 adjusts the interference power threshold value such that an interference power threshold value corresponding to the neighboring eNB is increased as a distance between the eNB 10-1 and the neighboring eNB becomes long. In the present embodiment, it is assumed that the other eNB interference power threshold value adjustment unit 164 adjusts the interference power threshold value such that the interference power threshold value corresponding to the neighboring eNB is increased as the distance between the eNB 10-1 and the neighboring eNB becomes long. In addition, the interference power threshold value may be adjusted in accordance with propagation loss between the eNB 10-1 and the neighboring eNB. Furthermore, the neighboring eNB may also adjust the interference power threshold value.

Furthermore, when new eNB is added, the other eNB interference power threshold value adjustment unit 164 adjusts the interference power threshold value to be reduced. For example, when information, which is transmitted from the upper node 20 and indicates that new eNB is added, is received through the S1 interface established in the backhaul 30 and the I/F unit 104, the other eNB interference power threshold value adjustment unit 164 is able to recognize that the new eNB is added on the basis of the information.

The interference power threshold value change request information transmission processing unit 166 transmits information on the adjusted interference power threshold value to the neighboring eNB through the I/F unit 104 and the X2 interface established in the backhaul 30 (the S1 interface when there is no X2 interface).

The interference power threshold value change request information reception processing unit 168 receives information on an adjusted interference power threshold value from another eNB, which determines the eNB 10-1 as neighboring eNB, through the X2 interface established in the backhaul 30 and the I/F unit 104.

Then, the eNB interference information transmission processing unit 162 changes the interference power threshold value to the adjusted interference power threshold value. In addition, when the interference power threshold value change request information reception processing unit 168 received information on adjusted interference power threshold values from a plurality of eNBs, the eNB interference information transmission processing unit 162 may calculate an average value, a maximum value, a minimum value and the like of the adjusted interference power threshold values, and change the interference power threshold value to the calculated values.

Moreover, on the basis of a signal from the UE 40-1, the eNB interference information transmission processing unit 162 attempts to detect RB (high interference RB), in which power is equal to or more than the adjusted interference power threshold value, from RBs assigned to the UE 40-1. When the high interference RB is detected, the eNB interference information transmission processing unit 162 generates high interference RB information including information capable of identifying the high interference RB similarly to the above. The eNB interference information transmission processing unit 162 transmits the generated high interference RB information to the eNB 10-2, the eNB 10-3, and the eNB 10-4 through the I/F unit 104 and the X2 interface established in the backhaul 30 (through the S1 interface when there is no X2 interface).

(3) Operation of Radio Communication System

Figure 8:
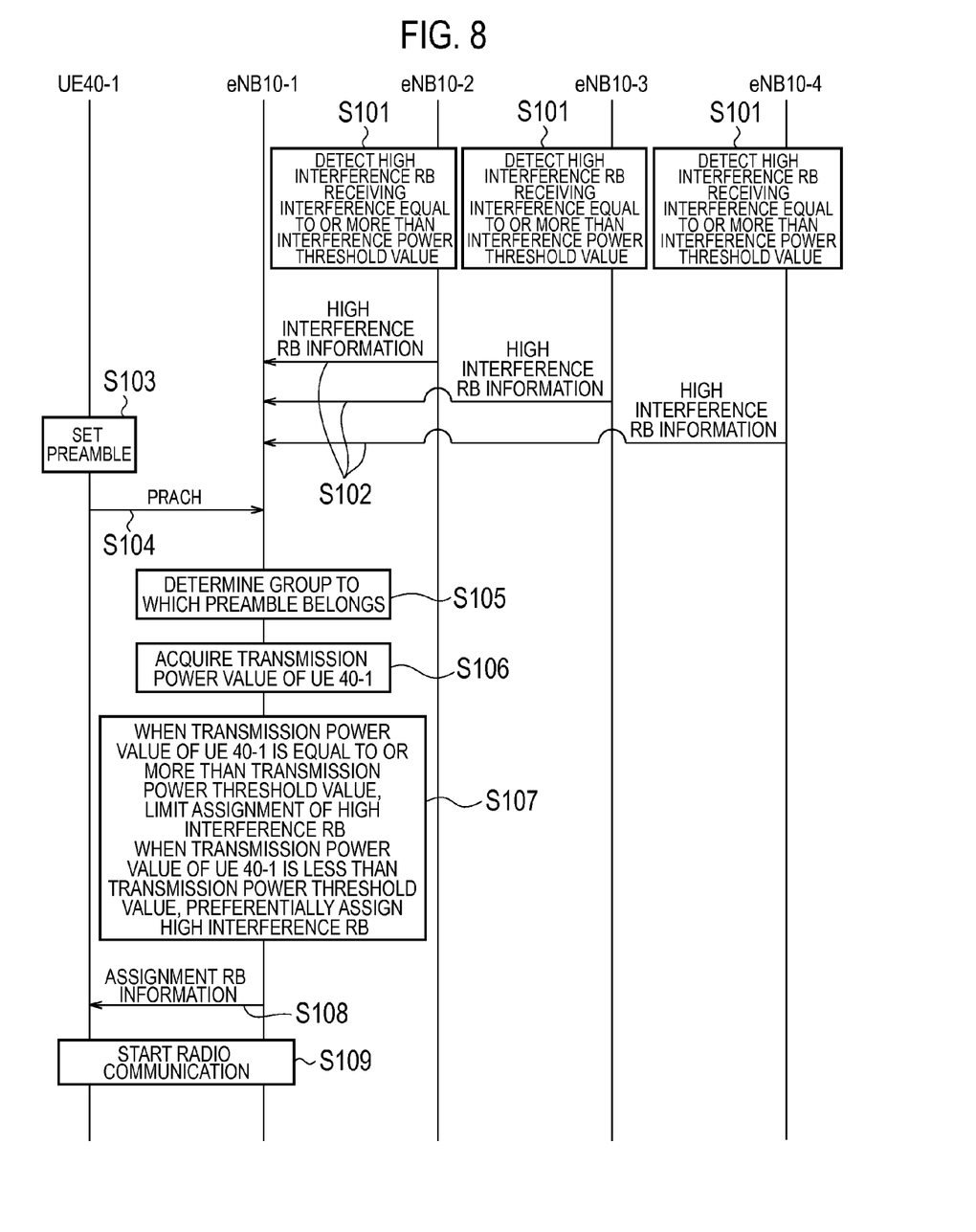
FIG. 8 is a sequence diagram illustrating a first operation of the radio communication system according to the embodiment of the present invention.

FIG. 8 is a sequence diagram illustrating a first operation of the radio communication system 1. The first operation illustrated in FIG. 8 corresponds to the aforementioned first process and second process.

In step S101, the control unit 102 of the eNB 10-2 receives a radio signal from the UE 40-2 connected to the eNB 10-2. Moreover, on the basis of the received radio signal, the control unit 102 of the eNB 10-2 detects high interference RB from RBs assigned to the UE 40-1. The control unit 102 of the eNB 10-3 and the control unit 102 of the eNB 10-4 also perform the same process.

In step S102, the control unit 102 of the eNB 10-2 transmits the high interference RB information to the eNB 10-1. Similarly, the control unit 102 of the eNB 10-3 and the control unit 102 of the eNB 10-4 transmit the high interference RB information to the eNB 10-1. The control unit 102 of the eNB 10-1 receives the high interference RB information from the eNB 10-2 to the eNB 10-4.

In step S103, the control unit 402 of the UE 40-1 sets a preamble belonging to the first group when the transmission power value of the UE 40-1 is equal to or more than the transmission power threshold value, and sets a preamble belonging to the second group when the transmission power value of the UE 40-1 is small than the transmission power threshold value.

In step S104, the control unit 402 of the UE 40-1 transmits a radio signal of PRACH corresponding to the set preamble to the eNB 10-1. The control unit 102 of the eNB 10-1 receives the radio signal of PRACH.

In step S105, the control unit 102 of the eNB 10-1 determines whether a preamble corresponding to the radio signal of PRACH belongs to the first group or the second group.

In step S106, the control unit 102 of the eNB 10-1 determines that the transmission power value of the UE 40-1 is equal to or more than the transmission power threshold value when the preamble belongs to the first group, and determines that the transmission power value of the UE 40-1 is smaller than the transmission power threshold value when the preamble belongs to the second group.

In step S107, when the transmission power value of the UE 40-1 is equal to or more than the transmission power threshold value, the control unit 102 of the eNB 10-1 limits the assignment of high interference RB to the UE 40-1, the high interference RB being indicated by the high interference RB information received from the eNB 10-2 to the eNB 10-4. Meanwhile, when the transmission power value of the UE 40-1 is smaller than the transmission power threshold value, the control unit 102 of the eNB 10-1 preferentially assigns the high interference RB to the UE 40-1, the high interference RB being indicated by the high interference RB information received from the eNB 10-2 to the eNB 10-4.

In step S108, assignment RB information including information capable of identifying assigned RB is transmitted to the UE 40-1. The UE 40-1 receives the assignment RB information. Then, in step S109, the eNB 10-1 and the UE 40-1 start radio communication using the RB assigned to the UE 40-1.

After the radio communication between the eNB 10-1 and the UE 40-1 is started, the operations of step S101 to step S108 are repeated. That is, in step S101, the control unit 102 of the eNB 10-2, the control unit 102 of the eNB 10-3, and the control unit 102 of the eNB 10-4 detect the high interference RB from RBs assigned to the UE on the basis of a radio signal from UE connected to corresponding eNB. Moreover, in step S102, the control unit 102 of the eNB 10-2, the control unit 102 of the eNB 10-3, and the control unit 102 of the eNB 10-4 transmit the high interference RB information to the eNB 10-1. The eNB 10-1 receives the high interference RB information from the eNB 10-2 to the eNB 10-4.

In step S103, the control unit 402 of the UE 40-1 sets a preamble belonging to the first group when the transmission power value of the UE 40-1 is equal to or more than the transmission power threshold value, and sets a preamble belonging to the second group when the transmission power value of the UE 40-1 is small than the transmission power threshold value.

In step S104, the control unit 402 of the UE 40-1 transmits a radio signal of PRACH corresponding to the set preamble to the eNB 10-1. The control unit 102 of the eNB 10-1 receives the radio signal of PRACH.

In step S105, the control unit 102 of the eNB 10-1 determines whether a preamble corresponding to the radio signal of PRACH belongs to the first group or the second group.

In step S106, the control unit 102 of the eNB 10-1 determines that the transmission power value of the UE 40-1 is equal to or more than the transmission power threshold value when the preamble belongs to the first group, and determines that the transmission power value of the UE 40-1 is smaller than the transmission power threshold value when the preamble belongs to the second group.

In step S107, when the transmission power value of the UE 40-1 is equal to or more than the transmission power threshold value, the control unit 102 of the eNB 10-1 limits the assignment of high interference RB to the UE 40-1, the high interference RB being indicated by the high interference RB information received from the eNB 10-2 to the eNB 10-4. Meanwhile, when the transmission power value of the UE 40-1 is smaller than the transmission power threshold value, the control unit 102 of the eNB 10-1 preferentially assigns the high interference RB to the UE 40-1, the high interference RB being indicated by the high interference RB information received from the eNB 10-2 to the eNB 10-4.

Figure 9:
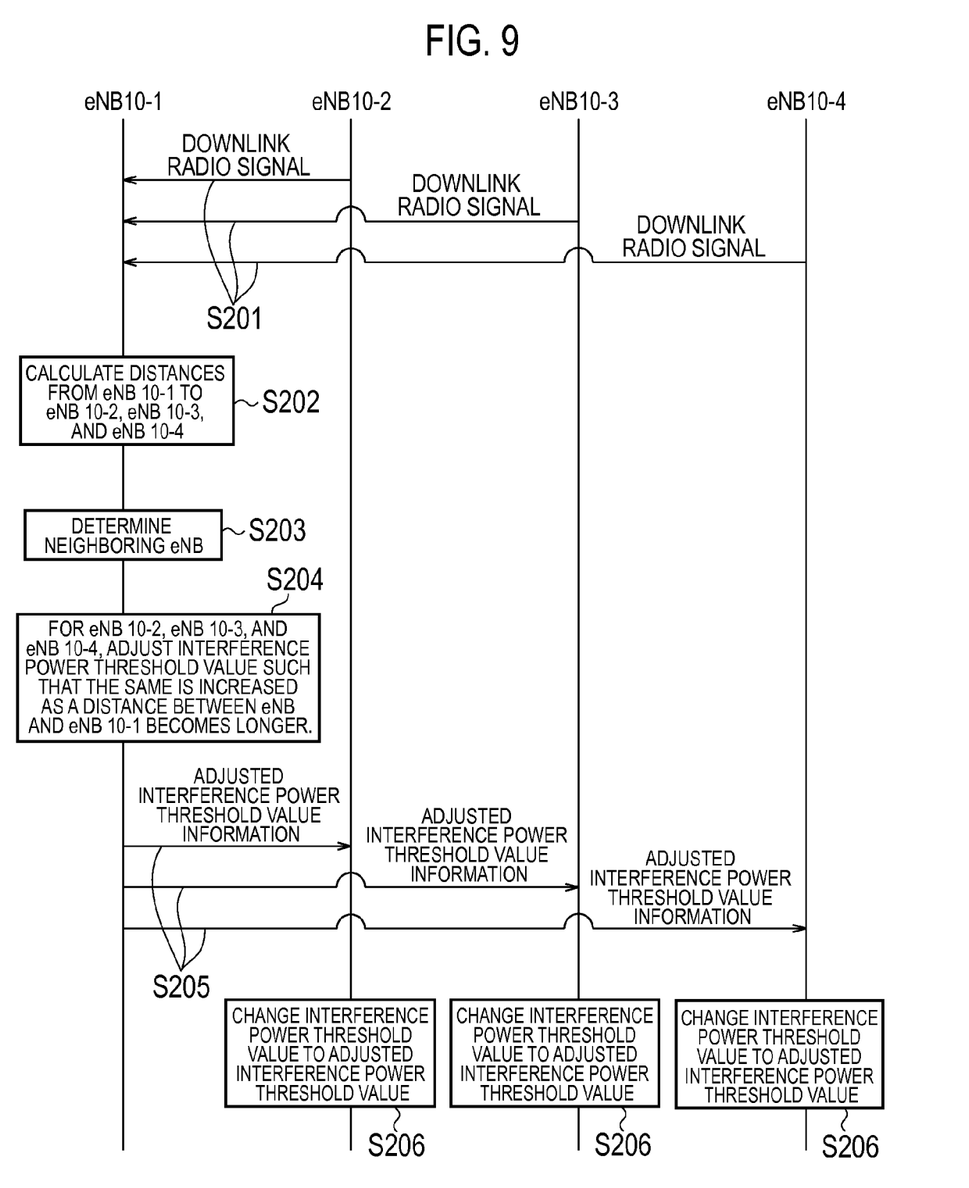
FIG. 9 is a sequence diagram illustrating a second operation of the radio communication system according to the embodiment of the present invention.

FIG. 9 is a sequence diagram illustrating a second operation of the radio communication system 1. The second operation illustrated in FIG. 9 corresponds to the aforementioned third process. Furthermore, a distance will be described as an example. However, propagation loss may be used instead of the distance.

In step S201, the eNB 10-2, the eNB 10-3, and the eNB 10-4 transmit a downlink radio signal to UE. There is a case in which the eNB 10-1 receives these downlink radio signals.

When the eNB 10-1 received the downlink radio signals from the eNB 10-2, the eNB 10-3, and the eNB 10-4, the control unit 102 of the eNB 10-1 calculates distances from the eNB 10-1 to the eNB 10-2, the eNB 10-3, and the eNB 10-4 in step S202.

In step S203, the control unit 102 of the eNB 10-1 determines neighboring eNB on the basis of the distances from the eNB 10-1 to the eNB 10-2, the eNB 10-3, and the eNB 10-4. Furthermore, it is assumed that the eNB 10-2, the eNB 10-3, and the eNB 10-4 are the neighboring eNB.

In step S204, for the eNB 10-2, the eNB 10-3, and the eNB 10-4, the control unit 102 of the eNB 10-1 adjusts the interference power threshold value such that an interference power threshold value corresponding to eNB is increased as a distance between the eNB and the eNB 10-1 becomes longer.

In step S205, the control unit 102 of the eNB 10-1 transmits information on the adjusted interference power threshold value to the eNB 10-2, the eNB 10-3, and the eNB 10-4. The control unit 102 of the eNB 10-2, the control unit 102 of the eNB 10-3, and the control unit 102 of the eNB 10-4 receive the information on the adjusted interference power threshold value.

In step S206, the control unit 102 of the eNB 10-2, the control unit 102 of the eNB 10-3, and the control unit 102 of the eNB 10-4 change the interference power threshold value to the adjusted interference power threshold value.

(4) Operation and Effect

In accordance with the radio communication system 1 according to the embodiment of the present invention, the eNB 10-1 receives the high interference RB information from the eNB 10-2 to the eNB 10-4 and acquires the transmission power value of the UE 40-1. Moreover, the eNB 10-1 limits the assignment of the high interference RB to the UE 40-1 when the transmission power value of the UE 40-1 is equal to or more than the transmission power threshold value, and preferentially assigns the high interference RB to the UE 40-1 when the transmission power value of the UE 40-1 is smaller than the transmission power threshold value. Consequently, in consideration of interference to the eNB 10-2 to the eNB 10-4 and the transmission power value of the UE 40-1, the eNB 10-1 is able to assign RB to the UE 40-1 such that the interference to the eNB 10-2 to the eNB 10-4 is reduced.

Furthermore, when there is RB (high interference RB) receiving interference equal to or more than the interference power threshold value, the eNB 10-1 transmits the high interference RB information to the eNB 10-2 to the eNB 10-4. Consequently, the eNB 10-2 to the eNB 10-4 are able to assign RB to UE such that interference to the eNB 10-1 is reduced.

Furthermore, the eNB 10-1 calculates the distances to the eNB 10-2, the eNB 10-3, and the eNB 10-4 that are transmission sources of downlink radio signals and are neighboring eNBs. Moreover, the eNB 10-1 adjusts the interference power threshold value such that the interference power threshold value corresponding to the neighboring eNB is increased as the distance between the eNB 10-1 and the neighboring eNB becomes long. In other words, when the neighboring eNB is remote from the eNB 10-1, in other words, when it is less probable that interference in the neighboring eNB is caused by communication between the eNB 10-1 and the UE 40-1, the interference power threshold value is adjusted. Thus, the neighboring eNB is made less likely to be regarded as high interference so as to prevent a case where the neighboring eNB transmits the high interference RB information to the eNB 10-1, which would otherwise result from the interference caused by communication between the eNB 10-1 and the UE 40-1. That is, the eNB 10-1 is able to prevent RB from being assigned by excessively considering the interference in the neighboring eNB, thereby achieving RB assignment in which inter-eNB interference is appropriately reduced.

(5) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiment, the eNB 10-1 performed the process (the third process) for adjusting the interference power threshold value. However, the upper node 20 may perform the process for adjusting the interference power threshold value.

Figure 10:
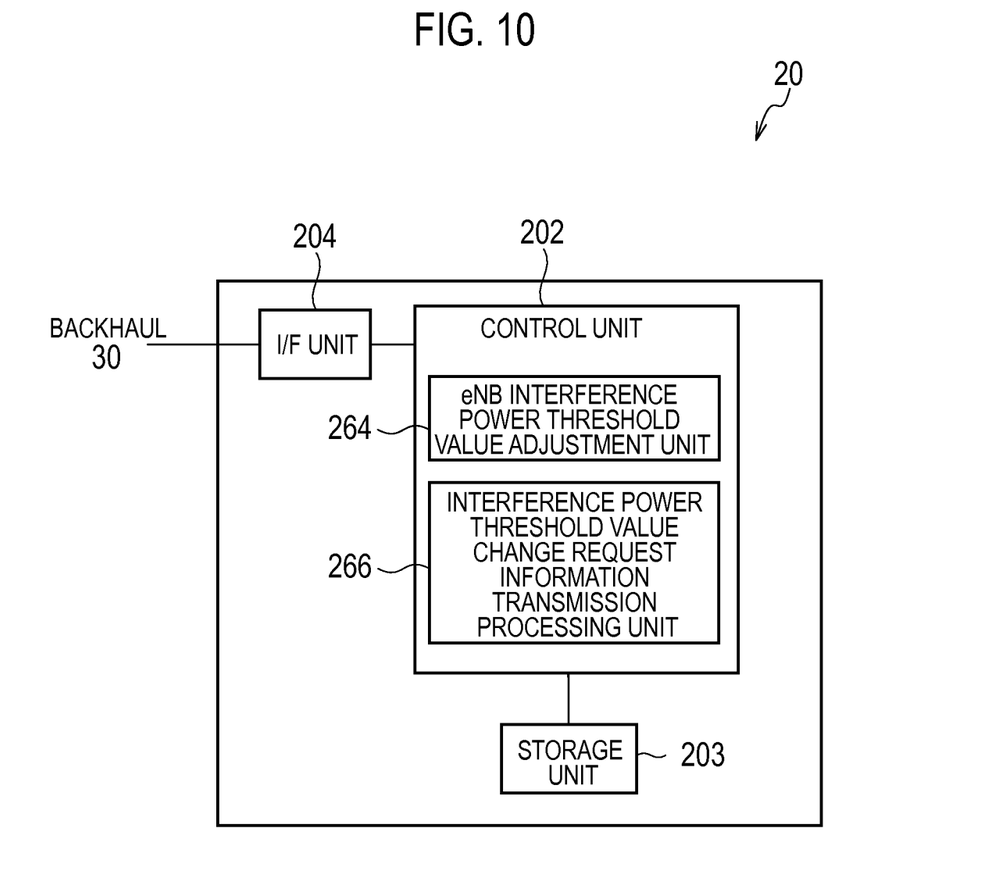
FIG. 10 is a configuration diagram of an upper node according to another embodiment of the present invention.

FIG. 10 is a diagram illustrating the configuration of the upper node 20 that performs the process for adjusting the interference power threshold value. The upper node 20 illustrated in FIG. 10 includes a control unit 202, a storage unit 203, and I/F unit 204.

The control unit 202, for example, is configured using a CPU (Central Processing Unit) or a DSP (Digital Signal Processor), and controls various functions provided in the upper node 20. The storage unit 203, for example, is configured by a memory, and stores various types of information used for the control and the like of the upper node 20. The I/F unit 204 is connected to the backhaul 30.

The control unit 202 includes an eNB interference power threshold value adjustment unit 264 and an interference power threshold value change request information transmission processing unit 266. Instead of the eNB 10-1, when the upper node 20 adjusts the interference power threshold value used in the eNB 10-2 to the eNB 10-4, the following process is performed.

The eNB interference power threshold value adjustment unit 264 calculates distances from the eNB 10-1 to the eNB 10-2, the eNB 10-3, and the eNB 10-4, which are transmission sources of received downlink radio signals, on the basis of the known positions of the eNB 10-1, the eNB 10-2, the eNB 10-3, and the eNB 10-4.

The eNB interference power threshold value adjustment unit 264 presets an neighboring eNB range corresponding to the eNB 10-1. The neighboring eNB range is a region of a predetermined range employing the eNB 10-1 as a center, and indicates a distance from the eNB 10-1.

Next, the eNB interference power threshold value adjustment unit 264 compares the distances from the eNB 10-1 to the eNB 10-2, the eNB 10-3, and the eNB 10-4 with the distance indicating the neighboring eNB range. Moreover, when the distance between the eNB 10-1 and the eNB 10-2 is equal to or less than the distance indicating the neighboring eNB range, the eNB interference power threshold value adjustment unit 264 determines the eNB 10-2 as neighboring eNB. Similarly, when the distance between the eNB 10-1 and the eNB 10-3 is equal to or less than the distance indicating the neighboring eNB range, the eNB interference power threshold value adjustment unit 264 determines the eNB 10-3 as neighboring eNB, and when the distance between the eNB 10-1 and the eNB 10-4 is equal to or less than the distance indicating the neighboring eNB range, the eNB interference power threshold value adjustment unit 264 determines the eNB 10-4 as neighboring eNB.

Next, the eNB interference power threshold value adjustment unit 264 reads an interference power threshold value stored in the storage unit 203 in advance. Then, the eNB interference power threshold value adjustment unit 264 adjusts the interference power threshold value for each neighboring eNB. Specifically, the eNB interference power threshold value adjustment unit 264 adjusts the interference power threshold value such that an interference power threshold value corresponding to the neighboring eNB is increased as a distance between the eNB 10-1 and the neighboring eNB becomes long.

The interference power threshold value change request information transmission processing unit 266 transmits information on the adjusted interference power threshold value to the neighboring eNB through the I/F unit 104 and the S1 interface established in the backhaul 30.

Furthermore, in the aforementioned embodiment, the eNB 10-1 and the upper node 20 adjusted the interference power threshold value on the basis of the distances between the eNB 10-1 and the eNB 10-2 to the eNB 10-4.

However, the eNB 10-1 and the upper node 20 may adjust the interference power threshold value on the basis of an index indicating the transmission power of the eNB 10-1. For example, the eNB 10-1 and the upper node 20 may increase the interference power threshold value corresponding to neighboring eNB as the transmission power of the eNB 10-1 is low. Alternatively, the eNB 10-1 and the upper node 20 may reduce the interference power threshold value corresponding to the neighboring eNB as propagation loss from the eNB 10-1 to the neighboring eNB is large.

Furthermore, in the aforementioned embodiment, the eNB 10-1 adjusted the interference power threshold value for each neighboring eNB. However, the eNB 10-1 may adjust the interference power threshold value on the basis of a distance to the eNB remotest from the eNB 10-1 among neighboring eNBs, and transmit information on one adjusted interference power threshold value to all the neighboring eNBs. Furthermore, the eNB 10-1 may divide the neighboring eNBs into a plurality of groups in accordance with the distance from the eNB 10-1, and adjust the interference power threshold value for each group.

Furthermore, in the aforementioned embodiment, the radio communication system 1 employed an LTE technology. However, the present invention can be applied in the same manner to radio communication systems using other radio communication technologies. Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-252346 (filed on Nov. 10, 2010) and Japanese Patent Application No. 2010-252348 (filed on Nov. 10, 2010) is incorporated in the present specification by reference.

[INDUSTRIAL APPLICABILITY]

According to the present invention, it is possible to assign a frequency resource to appropriately reduce interference between radio base stations.

The invention claimed is:

1. A radio base station comprising a radio communication system with an another radio base station, comprising:
   a first reception unit that receives information on a high interference frequency resource from the another radio base station, wherein the high interference frequency resource, interference power of which exceeds an interference power threshold value;
   an acquisition unit that acquires a transmission power value of a radio terminal; and
   a control unit that controls assignment of a frequency resource to the radio terminal on the basis of the information on the high interference frequency resource received by the first reception unit, and the transmission power value of the radio terminal acquired by the acquisition unit.

2. The radio base station according to claim 1, wherein
   the control unit limits assignment of the high interference frequency resource to a radio terminal having the transmission power value equal to or more than a transmission power threshold value, and preferentially assigns the high interference frequency resource to a radio terminal having the transmission power value smaller than the transmission power threshold value.

3. The radio base station according to claim 2, wherein
   preambles of a random access channel are divided into a first group and a second group in such a manner that preambles belonging to the first group are used by a radio terminal when the transmission power value is equal to or more than the transmission power threshold value, and preambles belonging to the second group are used by a radio terminal when the transmission power value is smaller than the transmission power threshold value, and
   the acquisition unit determines that the transmission power value is equal to or more than the transmission power threshold value when a preamble received from the radio terminal belongs to the first group, and determines that the transmission power value is smaller than the transmission power threshold value when the preamble received from the radio terminal belongs to the second group.

4. The radio base station according to claim 1, wherein,
   the control unit controls the assignment of the frequency resource to the radio terminal, in accordance with a change in the information on the high interference frequency resource and a change in the transmission power value of the radio terminal acquired by the acquisition unit during communication with the radio terminal.

5. The radio base station according to claim 1, comprising:
   a first transmission unit that transmits information for requesting a change in the interference power threshold value to the another radio base station.

6. The radio base station according to claim 1, comprising:
   a second transmission unit that transmits information on a high interference frequency resource to the another radio base station, the high interference frequency resource being a frequency resource in which interference power in the radio base station is equal to or more than the interference power threshold value.

7. The radio base station according to claim 1, comprising:
   a second reception unit that receives information for requesting a change in the interference power threshold value from the another radio base station; and
   a first adjustment unit that adjusts the interference power threshold value in accordance with the information for requesting a change in the interference power threshold value, the information being received by the second reception unit.

8. The radio base station according to claim 1, comprising:
   a second adjustment unit that increases the interference power threshold value when a new radio base station joins the radio communication system.

9. A communication control method in a radio base station forming a radio communication system together with an another radio base station, the method comprising:
   a step of receiving information on a high interference frequency resource from the another radio base station, wherein the high interference frequency resource, interference power of which is equal to or more than a predetermined threshold value;
   a step of acquiring a transmission power value of a radio terminal; and
   a step of controlling assignment of a frequency resource to the radio terminal on the basis of the received information on the high interference frequency resource, and the transmission power value of the radio terminal.

* * * * *